(12) United States Patent
Guo (10) Patent No.: US 10,688,866 B2
(45) Date of Patent: Jun. 23, 2020

(54) ELECTRIFIED (4WD) FOUR WHEEL DRIVE DEVICE

(71) Applicant: BorgWarner Inc., Auburn Hills, MI (US)

(72) Inventor: Chengyun Guo, Novi, MI (US)

(73) Assignee: BorgWarner Inc., Auburn Hills, MI (US)

(*) Notice: Subject to any disclaimer, the term of this patent is extended or adjusted under 35 U.S.C. 154(b) by 248 days.

(21) Appl. No.: 15/683,342

(22) Filed: Aug. 22, 2017

(65) Prior Publication Data

US 2019/0061521 A1  Feb. 28, 2019

(51) Int. Cl.

| | |
|---|---|
| *B60K 17/35* | (2006.01) |
| *B60K 17/356* | (2006.01) |
| *B60K 6/365* | (2007.10) |
| *B60K 6/442* | (2007.10) |
| *B60K 6/52* | (2007.10) |
| *B60K 17/342* | (2006.01) |
| *B60W 10/06* | (2006.01) |
| *B60W 10/08* | (2006.01) |
| *B60W 10/119* | (2012.01) |
| *B60W 20/10* | (2016.01) |
| *B60W 20/20* | (2016.01) |

(52) U.S. Cl.
CPC ............ *B60K 17/356* (2013.01); *B60K 6/365* (2013.01); *B60K 6/442* (2013.01); *B60K 6/52* (2013.01); *B60K 17/342* (2013.01); *B60K 17/35* (2013.01); *B60W 10/06* (2013.01); *B60W 10/08* (2013.01); *B60W 10/119* (2013.01); *B60W 20/10* (2013.01); *B60W 20/20* (2013.01); *B60W 2710/06* (2013.01); *B60W 2710/08* (2013.01); *B60Y 2200/92* (2013.01); *B60Y 2300/43* (2013.01); *B60Y 2300/60* (2013.01); *B60Y 2300/91* (2013.01); *B60Y 2400/73* (2013.01); *B60Y 2400/82* (2013.01); *Y10S 903/91* (2013.01); *Y10S 903/916* (2013.01); *Y10S 903/93* (2013.01)

(58) Field of Classification Search
CPC ..... B60K 17/356; B60K 6/442; B60W 10/119
See application file for complete search history.

(56) References Cited

U.S. PATENT DOCUMENTS

| | | | |
|---|---|---|---|
| 888,638 | A | 5/1908 | Morcher |
| 3,963,085 | A | 6/1976 | Vinton |
| 4,405,029 | A | 9/1983 | Hunt |
| 6,371,878 | B1 | 4/2002 | Bowen |
| 6,464,608 | B2 * | 10/2002 | Bowen ................... B60K 6/365 180/242 |
| 6,533,692 | B1 | 3/2003 | Bowen |

(Continued)

*Primary Examiner* — Derek D Knight
(74) *Attorney, Agent, or Firm* — Young Basile Hanlon & MacFarlane, P.C.

(57) ABSTRACT

A transfer case capable of multiple drive ratios (i.e. high and low) in all operating modes of a hybrid all-wheel or four-wheel drive vehicle. The transfer case comprises an input shaft, a primary output shaft, a secondary output shaft, an electric motor, and a planetary gear set. The secondary output shaft is selectively rotatably coupled to the primary output shaft. The planetary gear set has a ring gear rotatably fixed to the input shaft, a planet carrier rotatably fixed to the primary output shaft, and a sun gear rotatably fixed to an output of the electric motor.

18 Claims, 4 Drawing Sheets

(56) References Cited

U.S. PATENT DOCUMENTS

| | | | |
|---|---|---|---|
| 6,533,693 B2 * | 3/2003 | Bowen | B60K 6/365 180/242 |
| 6,896,635 B2 | 5/2005 | Tumback | |
| 7,291,080 B2 * | 11/2007 | Minagawa | B60K 6/365 475/5 |
| 7,395,893 B2 | 7/2008 | Porter | |
| 8,888,638 B2 * | 11/2014 | Mueller | B60K 6/365 475/5 |
| 10,202,031 B2 * | 2/2019 | Lo | B60K 17/28 |
| 2015/0008057 A1 * | 1/2015 | Lo | B60K 17/28 180/165 |

\* cited by examiner

ELECTRIFIED (4WD) FOUR WHEEL DRIVE DEVICE

TECHNICAL FIELD

This disclosure relates to hybrid drive systems, and, more particularly, to a transfer case for use in a hybrid four-wheel drive or all-wheel drive vehicle.

BACKGROUND

Four-wheel drive or all-wheel drive vehicles may include a torque transfer device, such as a transfer case, for transmitting torque from a drive source, such as an internal combustion engine, to a first output shaft and selectively to a second output shaft. Hybrid vehicles or hybrid powertrains typically include two different drive sources that cooperatively provide drive torque for moving the vehicle. For example, the two different drive sources can be an internal combustion engine and an electric motor. In such an example, the hybrid vehicle or hybrid powertrain can operate in various modes with drive torque being provided by the internal combustion engine alone, by the electric motor alone, or by both the internal combustion engine and the electric motor. However, past hybrid vehicles and hybrid powertrains utilize specialized powertrains that are considerably different from existing traditional powertrains, thereby requiring extensive design changes and cost increases.

SUMMARY

Transfer cases for all-wheel or four-wheel drive hybrid vehicles are disclosed. In a first implementation, a transfer case comprises an input shaft, a primary output shaft, a secondary output shaft, an electric motor, and a planetary gear set. The secondary output shaft is selectively rotatably coupled to the primary output shaft. The planetary gear set has a ring gear rotatably fixed to the input shaft, a planet carrier rotatably fixed to the primary output shaft, and a sun gear rotatably fixed to an output of the electric motor.

The electric motor and the second output shaft can be concentric. Torque is not directly transferred between the electric motor and the secondary output shaft. Torque can be indirectly transferred between the electric motor and the secondary output shaft via the primary output shaft. The secondary output shaft can be driven by the electric motor only when the primary output shaft is driven by the electric motor. A torque transfer mechanism can selectively rotatably couple the secondary output shaft to the primary output shaft. The ring gear can be operable in a first ring gear state, wherein the ring gear is grounded to a housing, and a second ring gear state, wherein the ring gear rotates freely. The sun gear can be operable in a first sun gear state, wherein the sun gear is grounded to a housing, a second sun gear state, wherein the sun gear rotates freely, and a third sun gear state, wherein the sun gear is coupled to the planet carrier for rotation therewith. A torque transfer mechanism can select the first ring gear state or the second ring gear state. A torque transfer mechanism can select the first sun gear state, the second sun gear state, or the third sun gear state.

In a second implementation, an all-wheel or four-wheel drive vehicle comprises an engine, a transfer case, and a controller. The transfer case has an electric motor, an input shaft selectively providing torque from the engine, a primary output shaft, a secondary output shaft selectively rotatably coupled to the primary output shaft, and a planetary gear set. The planetary gear set has a ring gear rotatably fixed to the input shaft, a planet carrier rotatably fixed to the primary output shaft, and a sun gear rotatably fixed to an output of the electric motor. The controller controls operation of the engine and the electric motor in a first mode of operation, wherein only the engine provides torque, a second mode of operation, wherein only the electric motor provides torque, a third mode of operation, wherein both the engine and the electric motor provide torque, and a fourth mode of operation, wherein a battery of the electric motor is recharged.

The ring gear can be operable in a first ring gear state, wherein the ring gear is grounded, and a second ring gear state, wherein the ring gear rotates freely. The sun gear can be operable in a first sun gear state, wherein the sun gear is grounded to a housing, a second sun gear state, wherein the sun gear rotates freely, and a third sun gear state, wherein the sun gear is coupled to the planet carrier for rotation therewith. The ring gear can be in the first ring gear state, the sun gear can be in the second sun gear state, and the engine and electric motor can be operated in either the second mode of operation or the fourth mode of operation. The ring gear can be in the second ring gear state, the sun gear can be in the first sun gear state, and the engine and electric motor can be operated in the first mode of operation. The ring gear can be in the second ring gear state, the sun gear can be in the second sun gear state, and the engine and electric motor can be operated in the third mode of operation. The ring gear can be in the second ring gear state, the sun gear can be in the third sun gear state, and the engine and electric motor can be operated in one of the first mode of operation, the second mode of operation, the third mode of operation, or the fourth mode of operation.

In a third implementation, a transfer case comprises an input shaft, a primary output shaft, a secondary output shaft selectively rotatably coupled to the primary output shaft, an electric motor, a first planetary gear set, and a second planetary gear set. The first planetary gear set has a first ring gear rotatably fixed to the input shaft, a first planet carrier rotatably fixed to the primary output shaft, and a first sun gear. The second planetary gear set has a second ring gear that is grounded, a second planet carrier selectively rotatably fixed to the first sun gear, and a second sun gear rotatably fixed to an output of the electric motor. The electric motor and the second output shaft can be concentric, and torque can be indirectly, instead of directly, transferred between the electric motor and the secondary output shaft indirectly via the primary output shaft.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

FIGS. 1-6 illustrate a transfer case 10 for a motor vehicle 1 that incorporates an electric motor 20 within the transfer case 10 so that the motor vehicle 1 can utilize two different drive sources, an engine 4 and the electric motor 20, without significantly altering other components of the motor vehicle 1. A planetary gear set 80 of the transfer case 10 functions as a speed coupling device to control how power flows in and out of the transfer case 10, by allowing the speed of the engine 4 and the speed of the electric motor 20 to be decoupled to avoid speed matching operation. The transfer case 10 is capable of multiple drive ratios (i.e. high and low) in all operating modes of the motor vehicle 1 and increases the regeneration efficiency of a battery 9 of the electric motor 20 by disconnecting the electric motor 20 from the engine 4 and a transmission 6.

Figure 1:
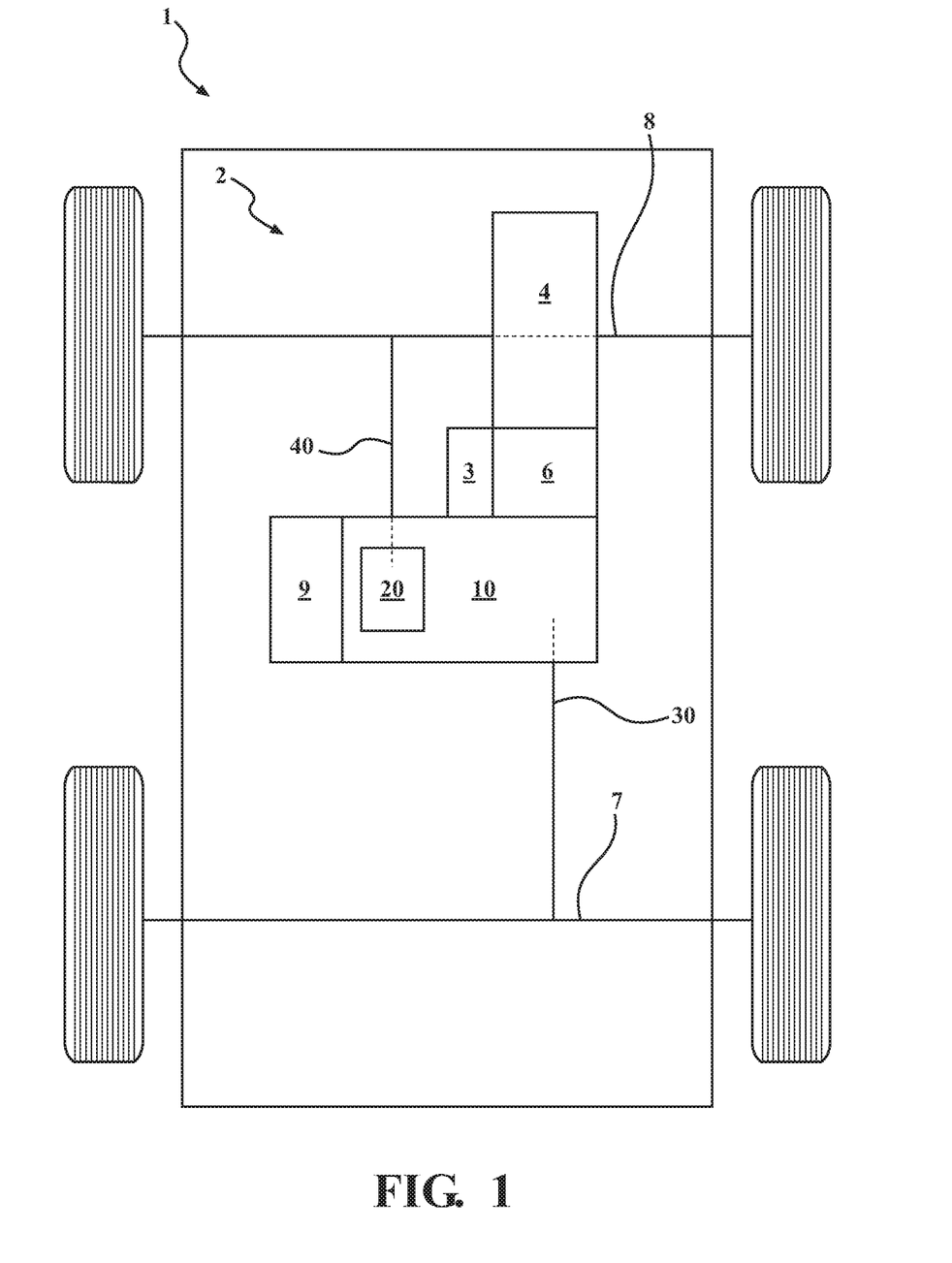
FIG. 1 is a schematic view of a vehicle having a first embodiment of a transfer case.

As shown in FIG. 1, the motor vehicle 1 includes a powertrain 2 for moving the motor vehicle 1. The powertrain 2 generally includes the engine 4, the transmission 6 operatively connected to the engine 4, and the transfer case 10. The engine 4 may be an internal combustion engine, such as a gasoline or diesel engine, which functions as an external drive source to the transfer case 10. The transfer case 10 transfers torque from the transmission 6 to a rear axle assembly 7 and/or a front axle assembly 8. The transfer case 10 can transfer torque to the rear axle assembly 7 via a primary output shaft 30 and selectively transfer torque to the front axle assembly 8 via a secondary output shaft 40. Alternatively, the transfer case 10 may transfer torque to the front axle assembly 8 via the primary output shaft 30 and selectively transfer torque to the rear axle assembly 7 via the secondary output shaft 40.

In addition to transferring torque from the transmission 6, the transfer case 10 can be configured to transfer torque between the electric motor 20 and the rear axle assembly 7 and/or the front axle assembly 8. The electric motor 20 functions as an internal drive source to the transfer case 10. The electric motor 20 may be powered by the battery 9 of the motor vehicle 1 and may partially charge the battery 9 by recapturing torque from the electric motor 20 and/or the engine 4. Coupling the electric motor 20 with the engine 4 results in the motor vehicle 1 having four modes of operation: (1) engine only, where only the engine 4 is providing torque, (2) electric only, where only the electric motor 20 is providing torque, (3) hybrid, where both the engine 4 and the electric motor 20 are providing torque, and (4) regeneration, where the battery 9 is recharged by recaptured torque.

The motor vehicle 1 can include one or more controllers 3 for controlling operation of the transfer case 10. For example, the one or more controllers 3 can control a current operation mode of the motor vehicle 1 based on detected conditions, such as dynamic conditions of the motor vehicle 1 and/or state of charge of the battery 9, and/or user inputs, such as selecting four-wheel or all-wheel drive. Internal components of the one or more controllers 3 can include a processor, memory, circuitry, and/or sensors (not shown).

As shown in FIGS. 2-5, the transfer case 10 includes the electric motor 20, the primary output shaft 30, the secondary output shaft 40, and the planetary gear set 80. The primary output shaft 30 and the secondary output shaft 40 can be substantially parallel to one another and rotatably supported by a housing 12 of the transfer case 10 via radial bearings 32. The planetary gear set 80 includes a sun gear 82, planet gears 84, a planet carrier 86, and a ring gear 88. The planet gears 84 are positioned radially between and are engaged with the sun gear 82 and the ring gear 88. The planet carrier 86 is coupled to the planet gears 84 and rotates relative to the sun gear 82 as the planet gears 84 orbit the sun gear 82. The planet carrier 86 is rotatably fixed to the primary output shaft 30 to rotate therewith and transfer torque therebetween.

The electric motor 20 generally includes a stator 22 fixed to the housing 12 of the transfer case 10, and a rotor 24 that rotates relative to the stator 22. As illustrated, the electric motor 20 is arranged within the housing 12 of the transfer case 10 with the stator 22 and the rotor 24 being concentric with the secondary output shaft 40. However, torque is not transferred directly between the rotor 24 of the electric motor 20 and the secondary output shaft 40. Instead, torque is indirectly transferred between the rotor 24 of the electric motor 20 and the primary output shaft 30 via a torque transfer mechanism 72. The torque transfer mechanism 72 can include primary sprockets 74 rotatably fixed to the primary output shaft 30, a secondary sprocket 76 rotatably fixed to the rotor 24 of the electric motor 20, and a first chain 78 extending between the primary sprocket 74 and the secondary sprocket 76. Other implementations of the torque transfer mechanism 72 can be used, such as using gears to transfer torque between the rotor 24 of the electric motor 20 and the primary output shaft 30.

A torque transfer mechanism 50 can allow the motor vehicle 1 to transition between two-wheel drive, where torque is transferred to only the primary output shaft 30, and four-wheel or all-wheel drive, where the secondary output shaft 40 is rotatably coupled to the primary output shaft 30 and torque is transferred to both the primary output shaft 30 and the secondary output shaft 40. The torque transfer mechanism 50 can generally include clutch plates 52, a primary sprocket 54 rotatably fixed to the clutch plates 52, a secondary sprocket 56 rotatably fixed to the secondary output shaft 40, and a chain 58 extending between the primary sprocket 54 and the secondary sprocket 56.

The clutch plates 52 can include a plurality of interleaved plates that are alternatingly, rotatably fixed to the primary output shaft 30 and a clutch housing. An outer plate of the clutch plates 52 can be considered an apply plate that is pressed by an actuator 34. When the interleaved plates of the clutch plates 52 are compressed, friction increases between the interleaved plates, which transfers torque between the primary output shaft 30 and the clutch housing. Ultimately, torque is transferred between the primary output shaft 30 and the secondary output shaft 40 via the clutch plates 52, the primary sprocket 54, the chain 58, and the secondary sprocket 56. Other implementations of the torque transfer mechanism 50 can be used, such as using gears to transfer torque between the primary output shaft 30 and the secondary output shaft 40.

To allow the engine 4 to be selectively decoupled from the primary output shaft 30, a torque transfer shift mechanism 60 can selectively, rotatably couple an output shaft 14 of the transmission 6 with the primary output shaft 30. The torque transfer shift mechanism 60 can be a clutch, such as a dog clutch, that allows the ring gear 88 of the planetary gear set 80 to be selectively operable in a first state or a second state. Other implementations of the torque transfer shift mechanism 60 can be used, such as another type of clutch or a band.

Figure 2:
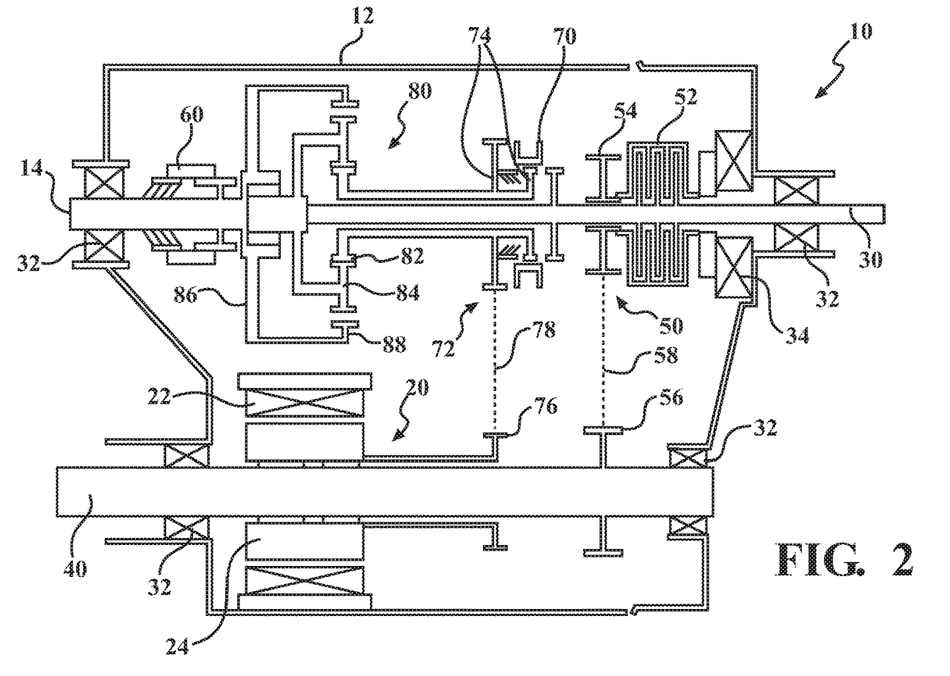
FIG. 2 is a schematic view of the transfer case of FIG. 1 shown in a first configuration.
Figure 3:
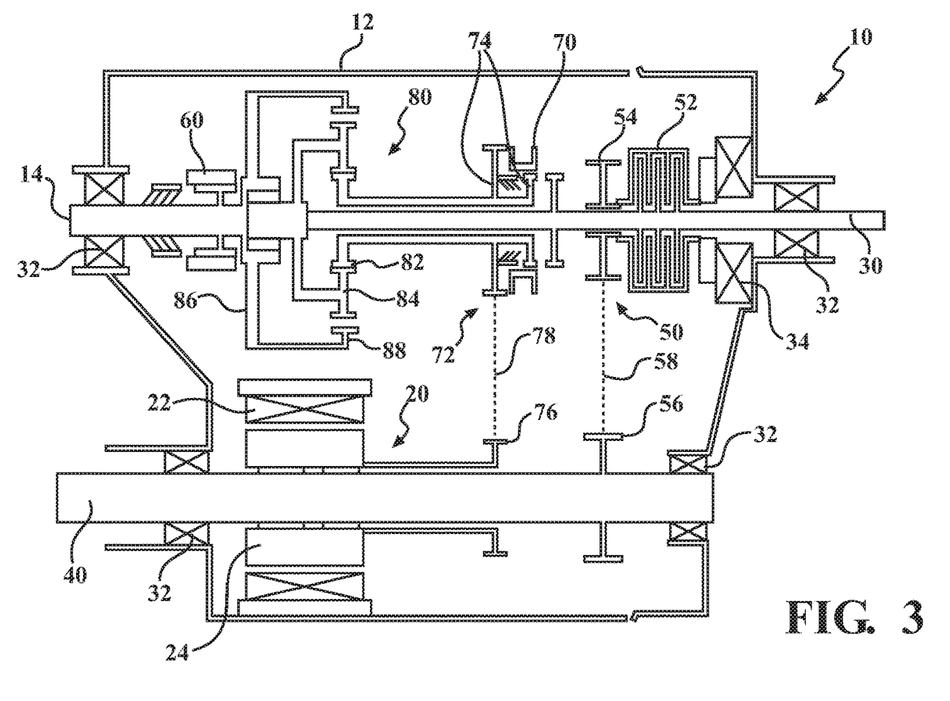
FIG. 3 is a schematic view of the transfer case of FIG. 1 shown in a second configuration.
Figure 4:
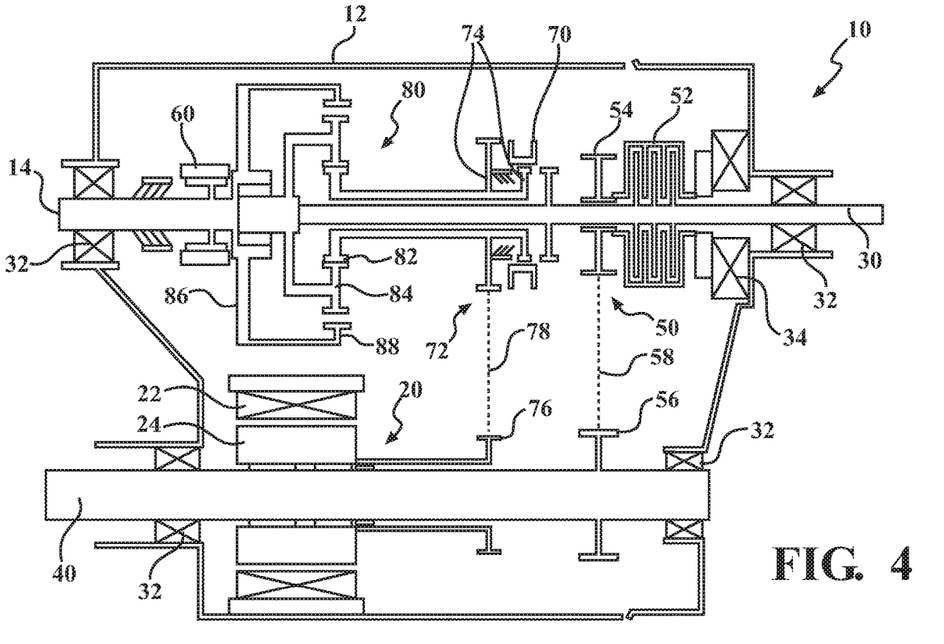
FIG. 4 is a schematic view of the transfer case of FIG. 1 shown in a third configuration.
Figure 5:
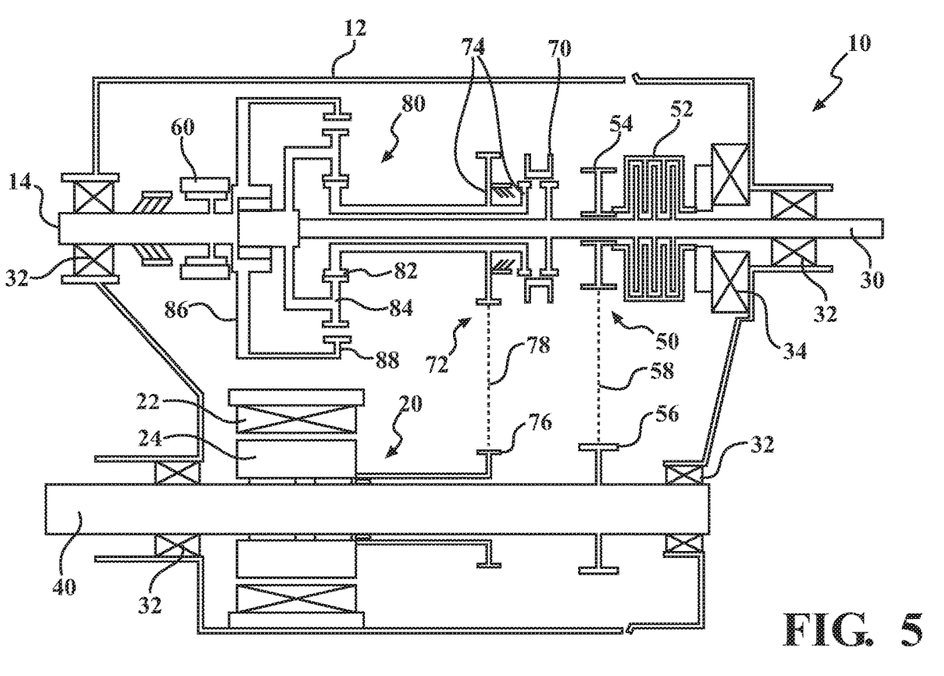
FIG. 5 is a schematic view of the transfer case of FIG. 1 shown in a fourth configuration.

The first state of the ring gear 88 is shown in FIG. 2, and the second state of the ring gear 88 is shown in FIGS. 3-5. In the first state, the ring gear 88 of the planetary gear set 80 is grounded (i.e. fixed) with the housing 12 of the transfer case 10, so that the engine 4 is effectively disconnected from the primary output shaft 30, and the motor vehicle 1 is driven solely by the electric motor 20. In the second state, the ring gear 88 of the planetary gear set 80 rotates freely within the housing 12 of the transfer case 10, so that torque from the engine 4 can be transferred to the primary output shaft 30. Rotation of the ring gear 88 should be ceased before the torque transfer mechanism 60 transitions the ring gear 88 from the second state to the fixed state.

A torque transfer shift mechanism 70 can selectively, rotatably couple the rotor 24 of the electric motor 20 to the primary output shaft 30 and selectively, rotatably couple the sun gear 82 and the planet carrier 86. The torque transfer shift mechanism 70 can be a clutch, such as a dog clutch, that allows the sun gear 82 to selectively be operable in a first state (shown in FIG. 3), a second state (shown in FIGS. 2 and 4), or a third state (shown in FIG. 5). In the first state, the sun gear 82 of the planetary gear set 80 is grounded (i.e. fixed) to the housing 12 of the transfer case 10 by the torque transfer shift mechanism 70. With the sun gear 82 grounded, no torque is transferred between the rotor 24 of the electric motor 20 and the primary output shaft 30, and the motor vehicle 1 is driven solely by the engine 4 in a low gear or drive ratio. In the second state, the torque transfer shift mechanism 70 allows the sun gear 82 to rotate freely so that torque can be transferred between the rotor 24 of the electric motor 20 and the primary output shaft 30. In the third position, the sun gear 82 is coupled to the planet carrier 86 by the torque transfer shift mechanism 70.

By selecting a combination of one of the first state or second state of the ring gear 88 and one of the first state, second state, or third state of the sun gear 82, the transfer case 10 allows the motor vehicle 1 to be operated in any one of the four operating modes in either a low drive ratio or a high drive ratio. When the ring gear 88 is in the first state (i.e. grounded) and the sun gear 82 is in the second state (i.e. rotates freely), as shown in FIG. 2, the motor vehicle 1 can be operated with the low drive ratio in either the electric only or regeneration modes. In the low drive ratio/electric only mode, torque is transferred from the rotor 24 of the electric motor 20 to the primary output shaft 30 via the torque transfer mechanism 72, the sun gear 82, the planet gears 84, and the planet carrier 86, and from the primary output shaft 30 to the secondary output shaft 40, via the torque transfer mechanism 50. In the low drive ratio/regeneration mode, torque is transferred from the primary output shaft 30 to the rotor 24 of the electric motor 20 via the planet carrier 86, the planet gears 84, the sun gear 82, and the torque transfer mechanism 72.

When the ring gear 88 is in the second state (i.e. rotates freely) and the sun gear 82 is in the first state (i.e. grounded), as shown in FIG. 3, the motor vehicle 1 can be operated with the low drive ratio in the engine only mode. In the low drive ratio/engine only mode, torque is transferred from the output shaft 14 of the transmission 6 to the primary output shaft 30, via the ring gear 88, the planet carrier 86 and the planet gears 84, and from the primary output shaft 30 to the secondary output shaft 40, via the torque transfer mechanism 50. When the ring gear 88 and the sun gear 82 are in the second state (i.e. both rotate freely), as shown in FIG. 4, the motor vehicle 1 can be operated with the low drive ratio in the hybrid mode. In the low drive ratio/hybrid mode, torque is transferred from the output shaft 14 of the transmission 6 to the primary output shaft 30, via the ring gear 88, the planet gears 84, and the planet carrier 86, and from the primary output shaft 30 to the secondary output shaft 40, via the torque transfer mechanism 50. Torque is also transferred from the rotor 24 of the electric motor 20 to the primary output shaft 30, via the torque transfer mechanism 72, the sun gear 82, the planet gears 84, and the planet carrier 86.

When the ring gear 88 is in the second state (i.e. rotates freely) and the sun gear 82 is in the third state (i.e. coupled to the planet carrier 86), as shown in FIG. 5, the motor vehicle 1 can be operated with the high drive ratio in all four operating modes. In the high drive ratio/engine only mode, torque is transferred from the output shaft 14 of the transmission 6 to the primary output shaft 30, via the locked planetary gear set 80, and from the primary output shaft 30 to the secondary output shaft 40, via the torque transfer mechanism 72. In the high drive ratio/electric only mode, torque is transferred from the rotor 24 of the electric motor 20 to the primary output shaft 30, via the torque transfer mechanism 72, the sun gear 82, and the planet carrier 86, and from the primary output shaft 30 to the secondary output shaft 40, via the torque transfer mechanism 50. In the high drive ratio/hybrid mode, torque is transferred from the output shaft 14 of the transmission 6 to the primary output shaft 30, via the locked planetary gear set 80, and from the primary output shaft 30 to the secondary output shaft 40, via the torque transfer mechanism 50. Torque is also transferred from the rotor 24 of the electric motor 20 to the primary output shaft 30 via the torque transfer mechanism 72, the sun gear 82, and the planet carrier 86. In the high drive ratio/regeneration mode, torque is transferred from the primary output shaft 30 to the rotor 24 of the electric motor 20 via the torque transfer mechanism 72, the planet carrier 86, and the sun gear 82.

Figure 6:
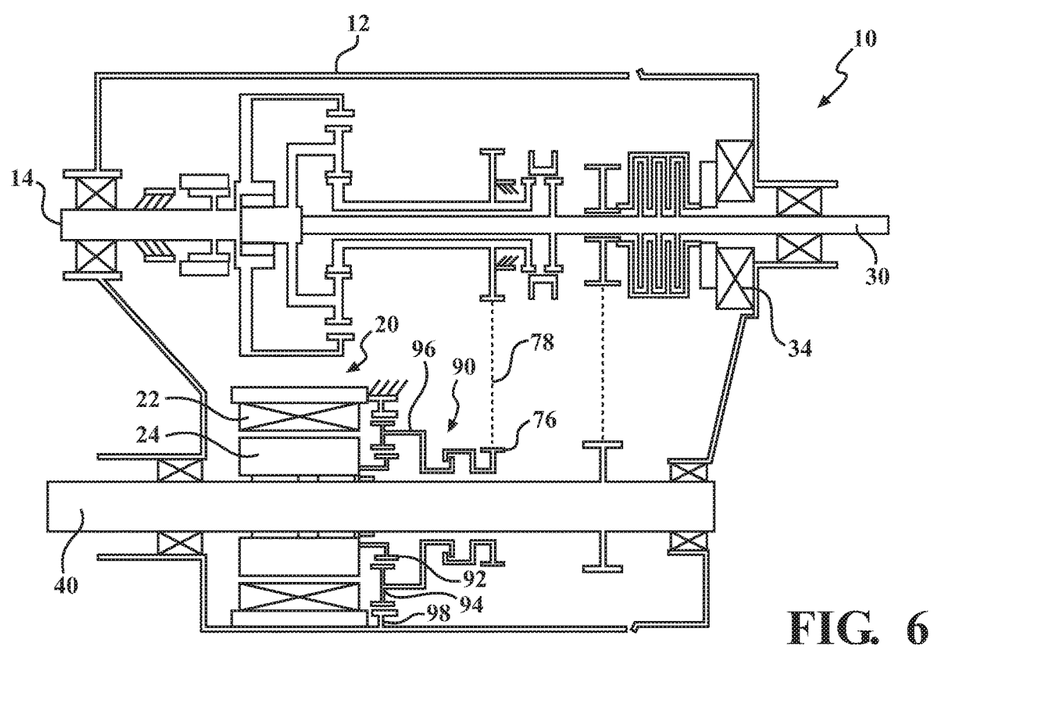
FIG. 6 is a schematic view of a second embodiment of the transfer case.

FIG. 6 shows the transfer case 10 with an optional planetary gear set 90 that increases the output ratio of the electric motor 20, which allows a smaller electric motor 20 to be used while delivering the same output torque as a larger electric motor 20. The optional planetary gear set 90 includes a sun gear 92, planet gears 94, a planet carrier 96, and a ring gear 98. The planet gears 94 are positioned radially between and are engaged with the sun gear 92 and the ring gear 98. The planet carrier 96 is coupled to the planet gears 84 and rotates relative to the sun gear 92 as the planet gears 94 orbit the sun gear 92. The sun gear 92 is rotatably fixed to the rotor 24 of the electric motor 20, and the ring gear 98 is grounded (i.e. fixed) to the housing 12 of the transfer case 10. The planet carrier 96 is selectively rotatably fixed to the secondary sprocket 76 of the torque transfer mechanism 72.

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A transfer case comprising:
   an input shaft;
   a primary output shaft;
   a secondary output shaft selectively rotatably coupled to the primary output shaft;
   an electric motor; and
   a planetary gear set having a ring gear rotatably fixed to the input shaft, a planet carrier rotatably fixed to the primary output shaft, and a sun gear rotatably fixed to an output of the electric motor, wherein the electric motor and the secondary output shaft are concentric.

2. The transfer case of claim 1, wherein torque is not directly transferred between the electric motor and the secondary output shaft.

3. The transfer case of claim 2, wherein torque is indirectly transferred between the electric motor and the secondary output shaft via the primary output shaft.

4. The transfer case of claim 1, wherein the secondary output shaft is driven by the electric motor only when the primary output shaft is driven by the electric motor.

5. The transfer case of claim 1, further comprising:
a torque transfer mechanism that selectively rotatably couples the secondary output shaft to the primary output shaft.

6. A transfer case comprising:
an input shaft;
a primary output shaft;
a secondary output shaft selectively rotatably coupled to the primary output shaft;
an electric motor; and
a planetary gear set having a ring gear rotatably fixed to the input shaft, a planet carrier rotatably fixed to the primary output shaft, and a sun gear rotatably fixed to an output of the electric motor, wherein the ring gear is operable in a first ring gear state, wherein the ring gear is grounded to a housing, and a second ring gear state, wherein the ring gear rotates freely, and wherein the sun gear is operable in a first sun gear state, wherein the sun gear is grounded to a housing, a second sun gear state, wherein the sun gear rotates freely, and a third sun gear state, wherein the sun gear is coupled to the planet carrier for rotation therewith.

7. The transfer case of claim 6, further comprising:
a torque transfer mechanism for selection of the first ring gear state or the second ring gear state.

8. A transfer case comprising:
an input shaft;
a primary output shaft;
a secondary output shaft selectively rotatably coupled to the primary output shaft;
an electric motor; and
a planetary gear set having a ring gear rotatably fixed to the input shaft, a planet carrier rotatably fixed to the primary output shaft, and a sun gear rotatably fixed to an output of the electric motor, wherein the sun gear is operable in a first sun gear state, where the sun gear is grounded to a housing, a second sun gear state, where the sun gear rotates freely, and a third sun gear state, where the sun gear is coupled to the planet carrier for rotation therewith.

9. The transfer case of claim 8, further comprising:
a torque transfer mechanism for selection of the first sun gear state, the second sun gear state, or the third sun gear state.

10. An all-wheel or four-wheel drive vehicle comprising:
an engine;
a transfer case having an electric motor, an input shaft, a primary output shaft, a secondary output shaft selectively, rotatably coupled to the primary output shaft, and a planetary gear set having a ring gear rotatably fixed to the input shaft, a planet carrier rotatably fixed to the primary output shaft, and a sun gear rotatably fixed to an output of the electric motor, wherein the electric motor and the secondary output shaft are concentric; and
a controller for controlling operation of the engine and the electric motor in a first mode of operation, wherein only the engine provides torque, a second mode of operation, wherein only the electric motor provides torque, a third mode of operation, wherein both the engine and the electric motor provide torque, and a fourth mode of operation, wherein a battery of electric motor is recharged.

11. The all-wheel or four-wheel drive vehicle of claim 10, wherein the ring gear is operable in a first ring gear state, wherein the ring gear is grounded to a housing, and a second ring gear state, wherein the ring gear rotates freely.

12. An all-wheel or four-wheel drive vehicle comprising:
an engine;
a transfer case having an electric motor, an input shaft, a primary output shaft, a secondary output shaft selectively, rotatably coupled to the primary output shaft, and a planetary gear set having a ring gear rotatably fixed to the input shaft, a planet carrier rotatably fixed to the primary output shaft, and a sun gear rotatably fixed to an output of the electric motor; and
a controller for controlling operation of the engine and the electric motor in a first mode of operation, wherein only the engine provides torque, a second mode of operation, wherein only the electric motor provides torque, a third mode of operation, wherein both the engine and the electric motor provide torque, and a fourth mode of operation, wherein a battery of electric motor is recharged, wherein the ring gear is operable in a first ring gear state, wherein the ring gear is grounded to a housing, and a second ring gear state, wherein the ring gear rotates freely, wherein the sun gear is operable in a first sun gear state, wherein the sun gear is grounded to a housing, a second sun gear state, wherein the sun gear rotates freely, and a third sun gear state, wherein the sun gear is coupled to the planet carrier for rotation therewith.

13. The all-wheel or four-wheel drive vehicle of claim 12, wherein the ring gear is in the first ring gear state, the sun gear is in the second sun gear state, and the engine and electric motor are operated in either the second mode of operation or the fourth mode of operation.

14. The all-wheel or four-wheel drive vehicle of claim 12, wherein the ring gear is in the second ring gear state, the sun gear is in the first sun gear state, and the engine and electric motor are operated in the first mode of operation.

15. The all-wheel or four-wheel drive vehicle of claim 12, wherein the ring gear is in the second ring gear state, the sun gear is in the second sun gear state, and the engine and electric motor are operated in the third mode of operation.

16. The all-wheel or four-wheel drive vehicle of claim 12, wherein the ring gear is in the second ring gear state, the sun gear is in the third sun gear state, and the engine and electric motor are operated in one of the first mode of operation, the second mode of operation, the third mode of operation, or the fourth mode of operation.

17. A transfer case comprising:
an input shaft;
a primary output shaft;
a secondary output shaft selectively rotatably coupled to the primary output shaft;
an electric motor;
a first planetary gear set having a first ring gear rotatably fixed to the input shaft, a first planet carrier rotatably fixed to the primary output shaft, and a first sun gear; and
a second planetary gear set having a second ring gear that is grounded, a second planet carrier selectively, rotatably fixed to the first sun gear, and a second sun gear rotatably fixed to an output of the electric motor.

18. The transfer case of claim 17, wherein the electric motor and the second output shaft are concentric, wherein torque is not directly transferred between the electric motor and the secondary output shaft, and wherein torque is indirectly transferred between the electric motor and the secondary output shaft indirectly via the primary output shaft.

\* \* \* \* \*